(12) United States Patent
El-Genk

(10) Patent No.: US 11,069,453 B1
(45) Date of Patent: Jul. 20, 2021

(54) LONG-LIFE, PORTABLE REACTOR FOR TERRESTRIAL POWER SYSTEMS (LPORTS)

(71) Applicant: Mohamed S. El-Genk, Albuquerque, NM (US)

(72) Inventor: Mohamed S. El-Genk, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 598 days.

(21) Appl. No.: 15/703,789

(22) Filed: Sep. 13, 2017

Related U.S. Application Data

(60) Provisional application No. 62/394,311, filed on Sep. 14, 2016, provisional application No. 62/394,631, filed on Sep. 14, 2016.

(51) Int. Cl.

| | | |
|---|---|---|
| *G21C 7/04* | (2006.01) | |
| *G21D 7/04* | (2006.01) | |
| *G21C 15/28* | (2006.01) | |
| *G21C 15/243* | (2006.01) | |
| *G21C 11/00* | (2006.01) | |

(52) U.S. Cl.
CPC .............. *G21D 7/04* (2013.01); *G21C 11/00* (2013.01); *G21C 15/243* (2013.01); *G21C 15/28* (2013.01); *G21Y 2004/305* (2013.01)

(58) Field of Classification Search
CPC ... G21C 1/04; G21C 1/06; G21C 1/16; G21C 1/22; G21D 7/00; G21D 7/04
See application file for complete search history.

(56) References Cited

U.S. PATENT DOCUMENTS

| | | | |
|---|---|---|---|
| 5,106,574 A | 4/1992 | El-Genk et al. | |
| 5,428,653 A | 6/1995 | El-Genk | |
| 2009/0279658 A1* | 11/2009 | Leblanc | G21C 5/126 376/360 |
| 2017/0054155 A1* | 2/2017 | Yee | H01M 14/00 |

OTHER PUBLICATIONS

Metzger, J. D., M. S. El-Genk, and A. G. Parlos, "Model-Reference Adaptive Control with Selective State-Variable Weighting Applied to a Space Nuclear Power System," J. Nuclear Science and Engineering , 109, 1991, 171.

U.S. Atomic Energy Commission; Power Reactors in Small Packages; Division of Tectincial Inforamtion; Library of Congress Catalog Card No. 68 60049; 31 pages.

El-Genk, M. S. and H. H. Saber, "High Efficiency. Segmented Thermoelectric for Operation between 973 K and 300 K," J. Energy Conversion and Management, 44(7), 2003, I 069-1088.

(Continued)

*Primary Examiner* — Marshall P O'Connor
(74) *Attorney, Agent, or Firm* — Keith A. Vogt; Keith Vogt, Ltd.

(57) ABSTRACT

A modular and transportable nuclear reactor system comprising a transportation module including a housing. A cask and a radiation shielding section are located in the housing with the shielding surrounding the cask. A high temperature sodium cooled reactor is located in the cask and the reactor is cooled by the natural circulation of in-vessel sodium. The reactor powers at least one thermal-to-electric conversion unit.

6 Claims, 5 Drawing Sheets

(56) References Cited

OTHER PUBLICATIONS

El-Genk, M. S. and Jean-Michel Tournier, "Analysis of Small Nuclear Power Plants with Static Energy Conversion," Progress in Nuclear Energy, 42(3), 2003, 283-310.
El-Genk, M. S. and Tournier, J.-M., "Effects of Working Fluid and Shaft Rotation Speed on the Performance ofHTR Plants and the Size ofCBC Turbo-Machine," J. Nucl. Eng. & Design, 239, 2009, 1811-1827.
El-Genk, M. S., H. Xue, and D. Paramonov, "Transient Analysis and Start-up Simulation of a Thermionic Space Nuclear Reactor System," J. Nuclear Technology, 105 (I), 1993,70-86.
El-Genk, M. S., N. J. Morley, D. G. Pelaccio and A. M. Juhasz, "Pellet Bed Reactor Concept for Nuclear Propulsion Applications," J. Propulsion and Power, 10 (6), 1994, 817-827.
El-Genk, M. S. and Jean-Michel Tournier, "SAIRS"—Scalable AMTEC Integrated Reactor Space Power System, J Progress in Nuclear Energy, 45(1), 2004, 25-69.
El-Genk, M.S., S. Hatton, C. Fox, and J.-M. Tournier, "SCoRe—Concepts of Liquid Metal Cooled Space Reactors for Avoidance of Single-Point Failure," Proceedings of Space Technology and Applications International Forum (STAIF-05), AIP Conference Proceedings No. 746, American Institute of Physics, Melville, NY, 2005, 473-484.
El-Genk, M. S. and D. Paramonov, Thermionic Conversion, Encyclopedia of Electrical and Electronics Engineering, John G. Webster, Editor, John Wiley & Sons, Inc., 22, 1999, 49-67.
El-Genk, M. S., Toumier, J.-M., P., and Gallo, B. M., "Dynamic Simulation of a Space Reactor System with Closed Brayton Cycle Loops," J. Propulsion and Power 26(3), 2010, 394-406.
El-Genk, M. S. and J.-M. Tournier, "DynMo-TE: .Dynamic Simulation Model for Space Reactor Power Systems with Thermoelectric Converters," J. Nuclear Engineering and Design, 236(23), 2006, 2501-2529.
El-Genk. M. S. and Gallo, B. M., "High-Power Brayton Rotating Unit for Space Reactor and Solar Power Systems," J. Propulsion and Power, 26 (I), 2010, 167-176.
El-Genk, M. S. and T. M. Schriener, "Long Operation Life Reactor for Lunar Surface Power," J. Nuclear Engineering and Design, 241, 20 II, 2339-2352.
El-Genk, M. S. and Jean-Michel Toumier, "AMTEC/TE Static Converter for High Energy Utilization, Small Nuclear Power Plants," J. Energy Conversion and Management, 45(4) 2004, 511-535.
El-Genk, M. S. and L. M. Palomino, "SLIMM-Scalable Liquid Metal Cooled Small Modular Reactor. Preliminary Design," Progress in Nuclear Energy, 85, 56-70,2015.
El-Genk, M. S., "Space Nuclear Reactor Power System Concepts with Static and Dynamic Energy Conversion," J. Energy Conversion and Management Special Issue on Space Nuclear Power and Propulsion, 49 (3), 2008,402-411.
El-Genk, M. S., "Space Reactor Power Systems with No Single Point Failures," J. Nuclear Engineering and Design, 238, 2008, 2245-2255.
Hatton, S. H. and M. S. El-Genk, ".S.ectored Compact Space Reactor (SCoRe) Concepts with a Supplementary Lunar Regolith Reflector," J. Progress in Nuclear Energy, 51,2009,93-108.
King, J. C. and M. S. El-Genk, "Thermal-Hydraulic and Neutronic Analyses of Submersion-Subcritical, Safe Space (S"4) Reactor", J. Nuclear Engineering and Design, 239(12), 2009, 2809-2819.
King, J. C. and M. S. El-Genk, "Submersion Subcritical Safe Space (S"4) Reactor," J. Nuclear Engineering and Design, 236, 2006,1759-1777.
Morley, N. J. and M. S. El-Genk, "Neutronics and Thermal-Hydraulics Analysis of the Pellet Bed Reactor for Nuclear Thermal Propulsion," J. Nuclear Technology, 109(1), 1995,87-107.
Paramonov, D. V. and M.S. El-Genk, "Development and Comparison of a TOPAZ-II System Model with Experimental Data," J. Nuclear Technology, I 08, No. 2, 1994, 157-170.
Schriener, T. M. and M. S. El-Genk, "Neutronics and Thermal-Hydraulics Analysis of a Liquid Metal Fast Reactor for Expandable Lunar Surface Power," Annals of Nuclear Energy, 41,2012, 48-60.
Schriener, T. M. and M. S. El-Genk, "A Neutronics Analysis of Long-Life, Sectored Compact Reactor Concepts for Lunar Surface Power," J. Progress in Nuclear Energy, 53( I), 20 I I, I 06-118.
Schriener, T.M. and M.S. El-Genk, "Comparative CFD Analyses of Liquid Metal Cooled Reactor for Lunar Surface Power," J. Nuclear Engineering and Design, 280, 20 14, I 05-121.
Schriener, T. M. and M. S. El-Genk, "Comparison of Reactivity Control Systems for the Submersion-Subcritical Safe Space (S"4) Reactor," Proceedings of Space Technology and Applications International Forum (STAIF-08), AfP Conference Proceedings No. 969, American Institute ofPhysics, Melville, NY, 2008, 348-361.
Schriener, T. M. and M. S. El-Genk, "Inherently Safe and Long-Life Fission Power System for Lunar Outposts," J. British Interplanetary Society, 66, 2013, 388-394.
AREVA; NGNP with Hydrogen Production Preconceptual Design Studies Report; Executive Summary; Jun. 2007; Document No. 12-9052076-000.
Kuznetsov; Options for small and medium sized reactors (SMRs) to overcome loss of economies of scale and incorporate increased proliferation resistance and energy security; Progress in Nuclear Energy 50 (2008) 242-250; Science Direct.
Griffith: U.S. Forward Operating Base Applications of Nuclear Power; Idaho National Laboratory; U.S. Department of Energy National Laboratory operated by Battelle Energy Alliance; Jan. 2015.
Corliss; Power Reactors in Small Packages; U.S. Atomic Energy Commission / Division of Technical Information; Library of Congress Catalog Card No. 98 60049; Oct. 1968.

* cited by examiner

LPORTS power system on a transport truck

LONG-LIFE, PORTABLE REACTOR FOR TERRESTRIAL POWER SYSTEMS (LPORTS)

RELATED APPLICATIONS

This application claims the benefit of U. S. Provisional Application Nos. 62/394,311 filed Sep. 14, 2016 and 62/394,631 filed Sep. 14, 2016 both of which are herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

For remote outposts and isolated and small communities, securing a fossil fuels supply could be costly and challenging. Small, portable nuclear reactor power systems are a practical and superior alternative for providing reliable electrical power supply and/or process heat to these communities and disaster relief efforts for extended periods without refueling.

The development of small reactors for terrestrial power has been explored, more than 60 years ago, with current interest in many countries. Developing portable compact reactor power systems has also been of military interest. As shown in Table I, various military units have differing power requirements.

TABLE 1

Electrical Power Requirements of US military forward operating bases

| | Electrical Power Requirements (kW$_e$) | | | |
|---|---|---|---|---|
| | Per person | Company (150 people) | Battalion (600 people) | Brigade (3500 people) |
| CENTCOM Sand Book | 0.7 | 105 | 420 | 2450 |
| "Base in a Box" concept | 1.8 | 270 | 1080 | 6300 |
| Air Force Expedition Airfield | 1.36 | | 750 (550 people) | 4500 (3300 people) |

The U.S. Army's Nuclear Power Program has produced the truck-portable ML-1 design, tested in the Gas-Cooled Reactor Experiment, and the modular PM-1, PM-2, and PM-3 pressurized power reactor (PWR) designs, deployed to Greenland, Ak., and Antarctica.

The development of mobile and compact reactor concepts takes into account several important requirements. To enable mobility and rapid transport and deployment, the reactor and the power system need to have a long-life and be lightweight and compatible with a variety of common modes of transportation. In addition to using a qualified transportation cask with protective barriers against impact and radiological release, in the unlikely event of a transportation accident, the reactor design should provide for maximum nuclear safeguards.

For enhanced performance and reliability of the reactor and the power system may consider passive means for cooling, such as natural convection without pumps, low operating pressure, static or a hybrid static and dynamic energy conversion options with ambient air cooling. Other considerations include avoidance of single point failures in reactor design and power system integration, load-following and maximum utilization of the reactor thermal power. For example, rejecting residual heat to ambient air enhances mobility and allows the power system operation and deployment in arid regions. This heat could be used for space heating in cold regions and water desalination in coastal regions. The LPORTS could be installed at a selected site below ground and mounted on seismic insolation bearings to avoid impact by projectiles and vulnerability to Earthquakes.

BRIEF SUMMARY OF THE INVENTION

In one embodiment, the present invention provides power systems that may be factory manufactured, assembled and sealed, for maximum nuclear safeguards and highest quality control, and shipped to site by rail, on large truck or on a barge, for maximum mobility.

In other embodiments, the present invention provides a Long-life, Portable and compact nuclear Reactor for efficient Terrestrial power Systems (LPORTS) capable of generating 100 kW$_e$-1.0 MW$_e$, for 10-20 full power year (FPY), or even longer, without refueling. The reactor design takes advantage of the good thermal properties and fission gas retentions, and compatibility of UN fuel with conventional CrFe steel cladding and core structure. The load-following, factory fabricated and sealed reactor provides for maximum nuclear safeguards and reliable passive operation. Natural circulation of in-vessel liquid sodium, with the aid of a tall in-vessel chimney and a Na/Na heat exchanger (HEX), cools the reactor core during nominal operation and after shutdown.

In other embodiments, the LPORTS of the present invention may use liquid metal heat pipes conductively coupled to the reactor vessel wall, or an in-vessel helically coiled tubes Na/Na HEX, near the top of the down-comer.

In other embodiments, the LPORTS of the present invention may use an ex-vessel sliding reflector or rotating drums for a redundant reactor control. The near atmospheric operation reduces the wall thickness and both the volume and mass of the reactor vessel. Also, the in-vessel sodium provides effective energy storage of decay heat after reactor shutdown, maintaining a large safety margin from boiling temperature. Furthermore, the sodium, in a frozen state, provides structural support of the core and structure components during transportation.

In other embodiments, the LPORTS of the present invention, for energy conversion, may use a thermally regenerative electrochemical device for the direct conversion of heat to electrical energy. In other embodiments, the LPORTS of the present invention use as the electrochemical device a static Alkali Metal Thermal-to-Electric Conversion with a thermoelectric bottom cycle (AMTEC-TE). The system may be cooled by natural circulation of ambient air to be used for space heating, and use combined dynamic cycle to generate electricity, for a total system thermal efficiency ~60% and total utilization of the reactor thermal power>80%

In other embodiments, a plurality of modular AMTEC-TE units may be connected thermal-hydraulically and electrically in parallel to provide for maximum redundancy and the avoidance of single point failures.

In other embodiments, the LPORTS of the present invention may be configured to use process heat for the cogeneration of alternative fuels, and low-grade heat for space heating and seawater desalination.

In other embodiments, the LPORTS of the present invention may use biological shielding materials and configurations, and options of integrating the reactor into a reliable, low maintenance power system for rapid removal and deployment and transport, while adequately shielded in a qualified impact resistant container or cask.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings generally illustrate, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In one embodiment, the LPORTS of the present invention may use one or more thermally regenerative electrochemical devices for the direct conversion of heat to electrical energy. A preferred device is a static Alkali Metal Thermal-to-Electric Conversion with a thermoelectric bottom cycle (AMTEC-TE), cooled by natural circulation of ambient air, and combined dynamic cycle for a system total thermal efficiency ~60%.

Figure 1A:
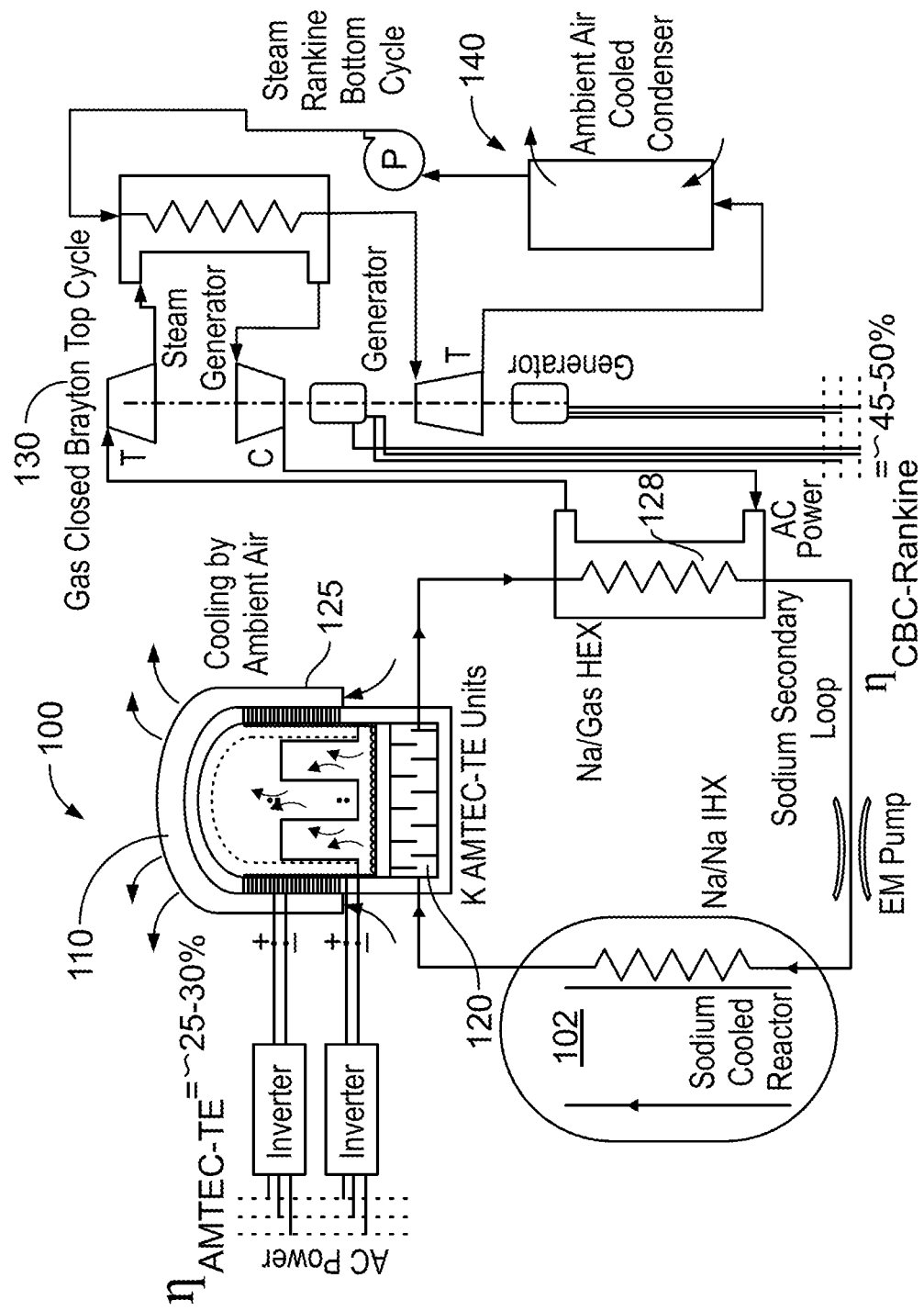
FIG. 1A illustrates a layout of a reactor for an embodiment of the present invention.

As shown in FIG. 1A, LPORTS 100 includes reactor 102, an Alkali Metal Thermal-to-Electric Conversion (AMTEC) 110 that provides modular unit designs and a wide range of electric powers from a $kW_e$ to a $MW_e$. The AMTEC thermal efficiency is the highest fraction of Carnot of any dynamic and other static conversion technologies known today. Potassium AMTEC units, designed and analyzed for generating 6.0 kWe to 1.0 MWe, typically operate at a hot side temperature of 950-1050 K and a condenser temperature of 500-600 K.

At these temperatures, residual heat is directed to bottom TE elements 120, which generated attritional electricity, reject waste heat to ambient air using water heat pipes fins 125. The primary working fluid exits HEX 128 in the AMTEC units, connected thermal-hydraulically in parallel, at 900-1000 K. This enables the co-production of alternative fuels and/or co-generation of high voltage AC electricity using combined dynamic energy conversion of a top closed Brayton cycle 130 and a bottom Rankine steam cycle 140, with air cooling as shown in FIG. 1.

Figure 1B:
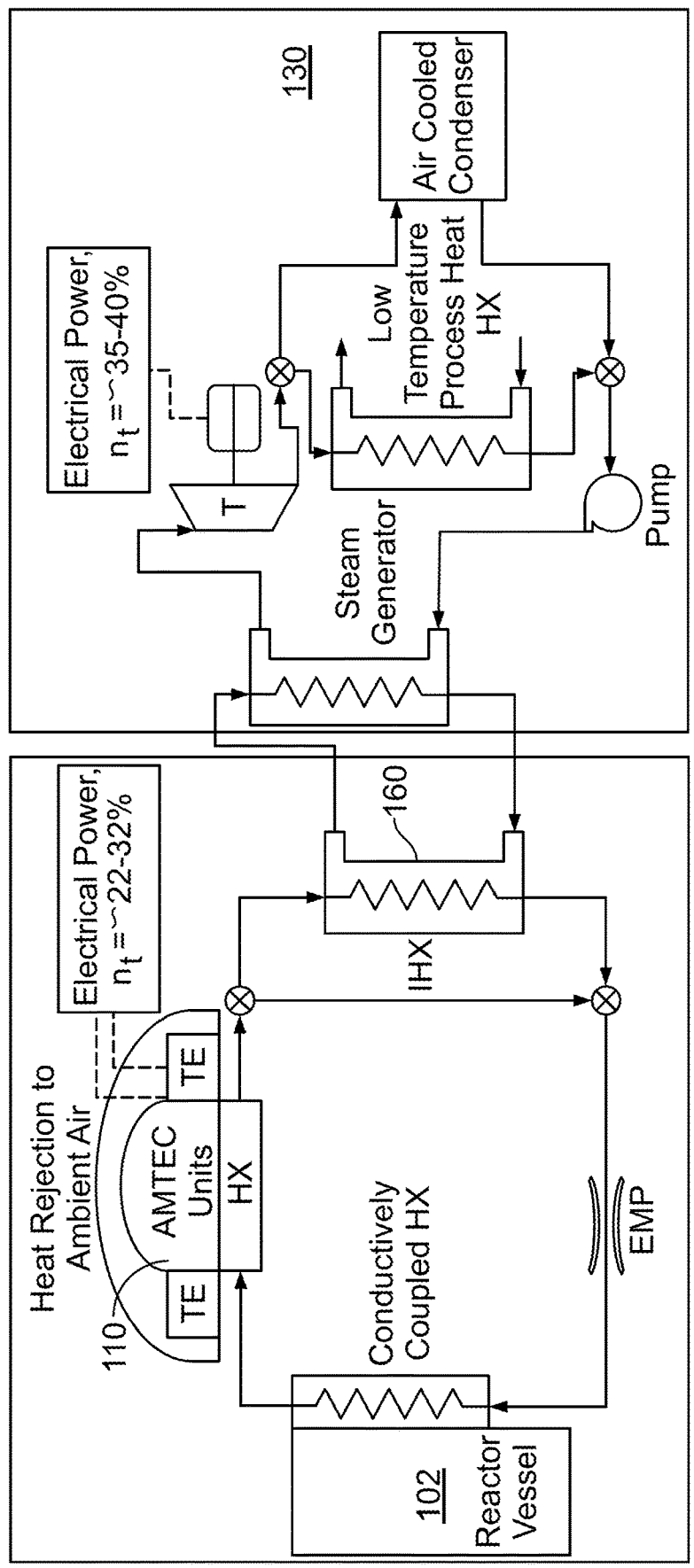
FIG. 1B depicts a reactor power system module coupled with separate steam Rankine bottoming cycle plant module for enhanced electrical generation for an embodiment of the present invention.
Figure 1C:
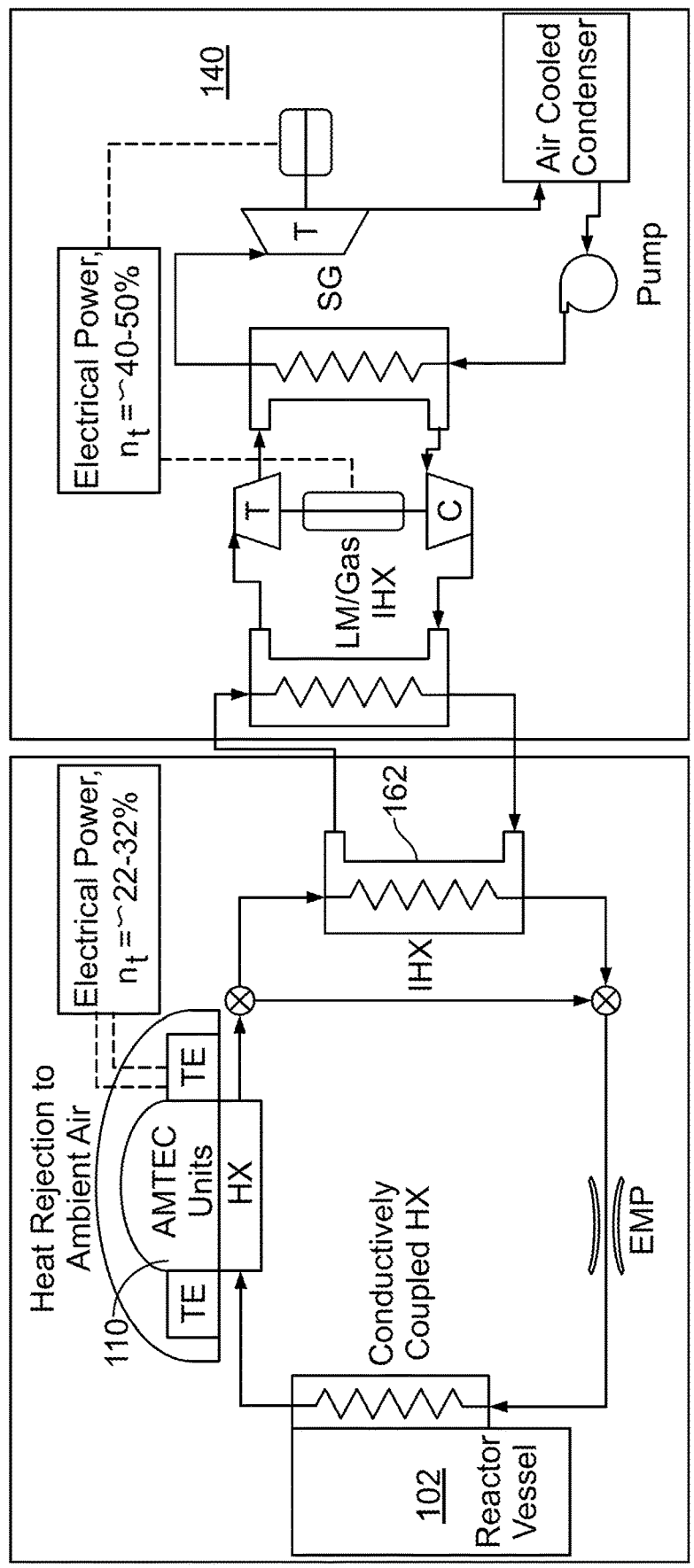
FIG. 1C shows a reactor power system module coupled with separate combined closed Brayton cycle for an embodiment of the present invention.
Figure 1D:
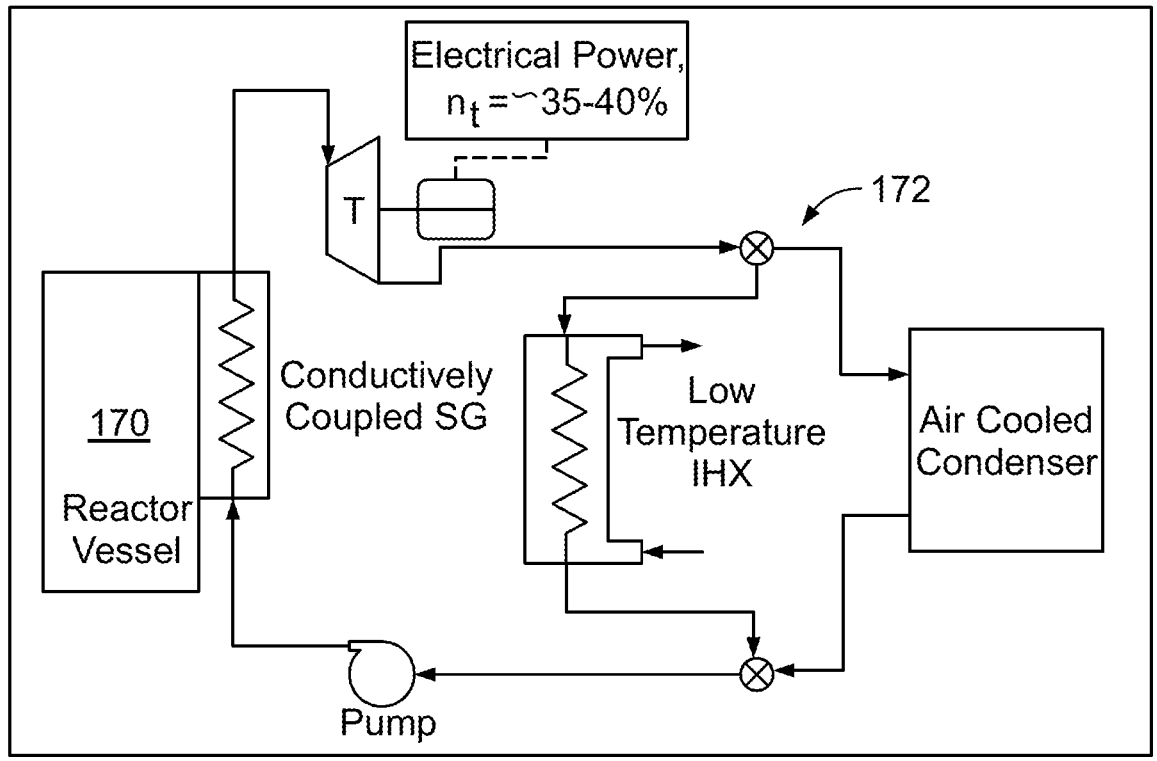
FIG. 1D shows a reactor power system configured for use with a superheated steam Rankine cycle for an embodiment of the present invention.

In an alternate embodiment, as shown in FIG. 1B, AMTEC 110 may be coupled by HEX 160 to Rankine steam cycle 140, with air cooling. In another alternate embodiment, as shown in FIG. 1C, AMTEC 110 may be coupled by HEX 162 to closed Brayton cycle 130. In yet another alternate embodiment, as shown in FIG. 1D, reactor 170 may be coupled to Rankine steam cycle 172.

The (AMTEC-TE) units may also be configured to provide electrical power at 200-400 VDC, or lower, at a thermal efficiency of 25-30%. The combined cycle, also cooled by ambient air, will provide high voltage AC electricity at a thermal efficiency of 45-50%, for an overall power system efficiency more than 60%. The parallel-connected AMTEC-TE units provide for maximum redundancy and allow replacing malfunctioning units without shutting down the reactor.

Figure 2:
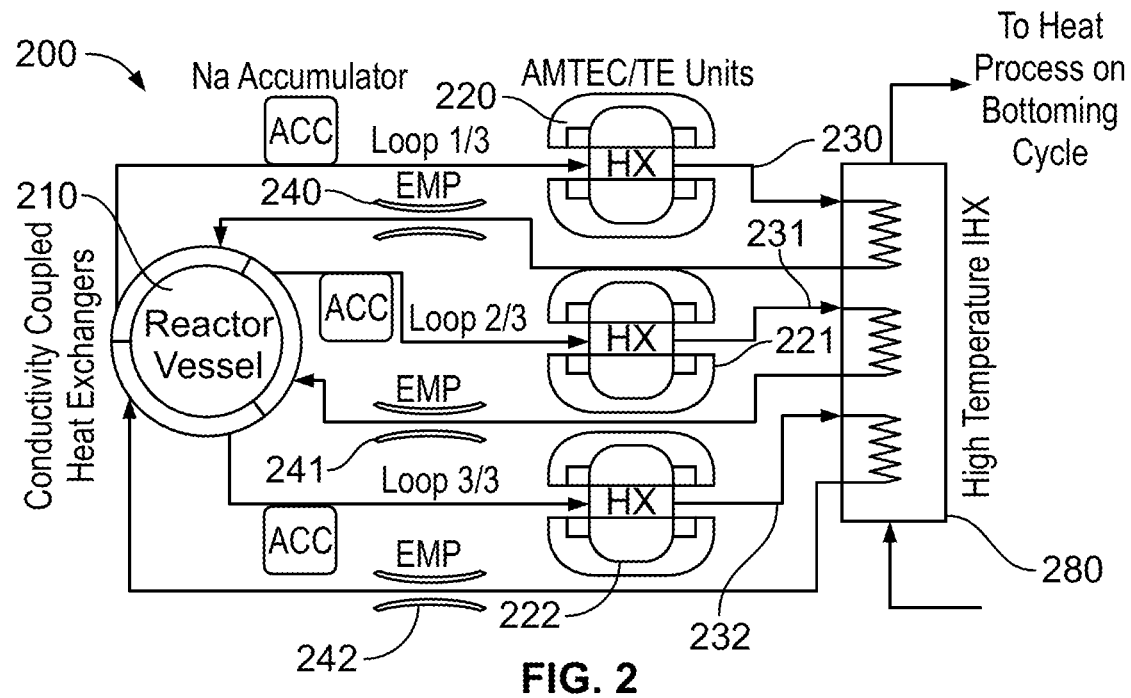
FIG. 2 is a layout of all-passive SIMPLE reactor power system with a plurality of AMTEC/TE for another embodiment of the present invention.

As shown in FIG. 2, in another embodiment the present invention provides a Safe InterModal Portable Long-life Energy reactor power system (SIMPLE). The SIMPLE reactor power system 200 combines a high temperature sodium cooled reactor 210, cooled by the natural circulation of the in-vessel sodium, with a plurality of thermally regenerative electrochemical devices 220-222 for the direct conversion of heat to electrical energy which may be AMTEC conversion units with integrated TE bottoming cycles thermally connected to secondary liquid-sodium loops 230-232 with static electromagnetic pumps (EMP) 240-242 and heat rejection by the natural circulation of ambient air. This embodiment provides a robust plant configuration that is entirely passive and inherently load following, with no moving mechanical parts and redundant reactor control mechanisms. Reliability may be enhanced by multiple secondary loops 240-242 which allow the system to continue operation in the event of a failure in one of the EMPs or AMTEC units. Furthermore, the reactor core is contained within a sealed reactor vessel, with no duct penetrations, utilizing external reactivity control and heat removal through the vessel wall by conductively coupled heat exchangers to the secondary sodium loops.

Increased energy utilization is made possible through the intermediate heat exchanger (IHX) 280 connected to the secondary sodium loops 230-232. Reactor's 210 thermal power would be increased with the additional thermal energy generation transferred through the IHX to process heat applications, such as the high-temperature production of liquid transportation fuels. Alternatively, IHX 280 may connect to bottoming cycle module, such as a superheated steam cycle plant, for additional electrical power generation. This would allow the versatile SIMPLE system to adapt to a variety of mission electricity and thermal energy demands using a common modular architecture. Further development and analyses of the SIMPLE concept are needed to develop a detailed point design which meets the safety and performance requirements within the size and mass limitations.

Figure 3:
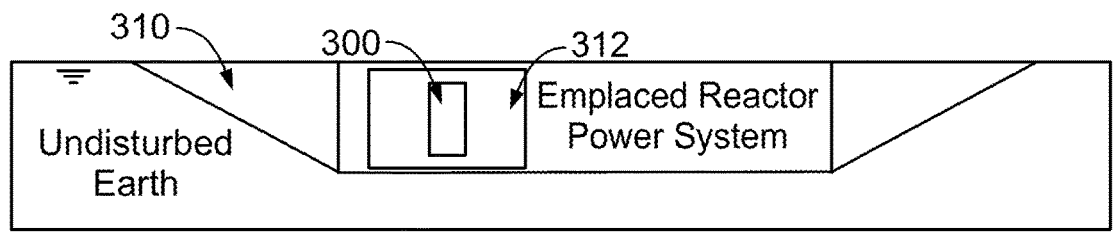
FIG. 3 illustrates a reactor emplaced below grade onsite for another embodiment of the present invention.

As shown in FIG. 3, reactor power system 300 may be emplaced below grade to protect the reactor from external attack and to utilize the surrounding earth 310 as a supplement to radiation shielding 312. The SIMPLE reactor concept provides protection against the release of radioactive material in the event of a transportation accident using a strong reactor vessel and by allowing the primary sodium coolant to freeze before transport, encasing the core within a solid block.

The self-contained SIMPLE power system module may be configured to be capable of supplying ~100-300 kW$_e$ for ten years, supporting a company scale field installation.

The self-contained SIMPLE reactor concept may be designed to fit within the weight limit (<30 MT) and dimensions of a high cube intermodal shipping container. This enables the design to be transported and handled using existing infrastructure and equipment, allowing for its rapid transport and delivery by standard semi-truck, rail car, ship, or military cargo aircraft.

Figure 4:
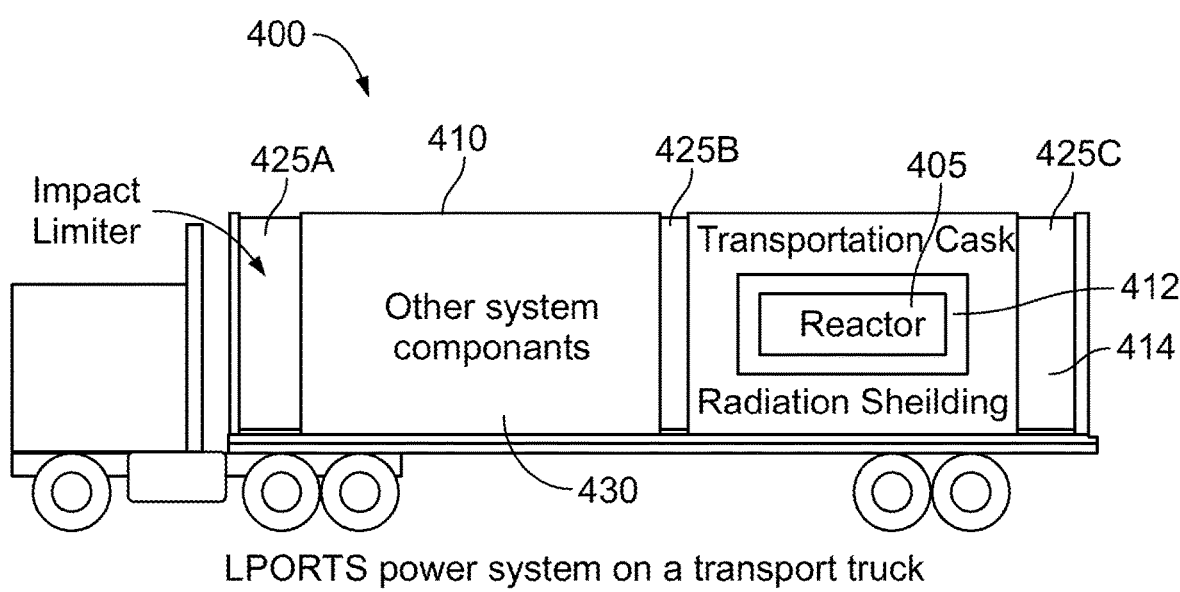
FIG. 4 illustrates a system of transport for another embodiment of the present invention.

As shown in FIG. 4, in one preferred embodiment of the present invention, transportation module 400 may be used to transport reactor 405. Module 400 may include housing 410, cask 412, radiation shielding 414 and a plurality of spaced apart impact absorbing sections 425A-425C. The other components of the system 430 may also be included in the module.

In a preferred embodiment, reactor 405 is located in cask 412 which is surrounded by radiation shielding 414. To reduce and/or prevent damage during transport, these components may be isolated from the housing by impact absorbing sections 425B and 425C. Impact absorbing sections 425B and 425C may partially surround the components by locating the components in-between the sections or panels of the absorber. In other embodiments, absorber surrounds the components.

Housing 410 may also include a section to house the other components of the system such as other top and bottom cycle components. To reduce and/or prevent damage during transport, these components may be isolated from the housing by impact absorbing sections 425A and 425B. Impact absorbing sections 425A and 425B may partially surround the components by locating the components in-between the sections or panels of the absorber. In other embodiments, absorber surrounds the components.

In yet another embodiment, the present invention is configured so that the decay heat after reactor shutdown is removed safely using passive means of natural circulation of in-vessel liquid sodium aided by liquid metal heat pipes along the wall of the reactor primary vessel as well as by natural circulation of ambient air at the outer surface of the reactor guard vessel. The large inventory of the in-vessel liquid sodium also provides excellent thermal energy storage.

In addition to the redundant reactor control and emergency shutdown, the large negative temperature reactivity of the reactor core and the in-vessel liquid sodium could shutdown the reactor with modest increase in temperature, while maintaining a large temperature safety margin from the boiling temperature of sodium. In short, core meltdown is eliminated in the embodiments of the present invention. While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A transportable nuclear reactor system comprising:
a transportable housing having a top, bottom, front and rear;
a plurality of wheels connected to said bottom of said transportable housing on which said transportable housing rests;
a plurality of impact absorbing sections, said impact absorbing sections extend from said top to said bottom of said transportable housing;
said plurality of impact absorbing sections spaced apart with one impact absorbing section located at said front of said transportable housing, one impact absorbing section located at said rear of said transportable housing, and one impact absorbing section located in between said front and rear of said transportable housing;
said spaced apart impact absorbing sections define a plurality of openings;
a cask and radiation shielding section surrounding said cask;
a high temperature sodium cooled reactor located in and surrounded by said cask, said reactor cooled by the natural circulation of in-vessel sodium;
said reactor, said cask and said radiation shielding section located in one of said openings defined by said spaced apart impact absorbing sections; and
at least one thermally regenerative electrochemical device connected thermal-hydraulically to said reactor located in another of said openings defined by said spaced apart impact absorbing sections.

2. The nuclear reactor of claim 1 wherein said at least one thermally regenerative electrochemical device is a static Alkali Metal Thermal-to-Electric Conversion unit with a thermoelectric bottom cycle.

3. The nuclear reactor of claim 2 wherein said system rejects heat by the natural circulation of ambient air.

4. The nuclear reactor of claim 3 wherein said system further includes a heat exchanger in communication with said bottom cycle, said heat exchanger connected thermal-hydraulically to a top closed Brayton cycle.

5. The nuclear reactor of claim 3 wherein said system further includes a heat exchanger in communication with said bottom cycle, said heat exchanger connected thermal-hydraulically in to a bottom Rankine steam cycle.

6. The nuclear reactor of claim 3 wherein said system further includes a heat exchanger in communication with said bottom cycle, said heat exchanger connected thermal-hydraulically to a top closed Brayton cycle and a bottom Rankine steam cycle.

* * * * *